(12) United States Patent
Kulik et al.

(10) Patent No.: US 9,834,170 B1
(45) Date of Patent: Dec. 5, 2017

(54) COLLAPSIBLE RADIATOR SUPPORT BRACKETS FOR PEDESTRIAN SAFETY

(71) Applicant: Toyota Motor Engineering & Manufacturing North America, Inc., Erlanger, KY (US)

(72) Inventors: Mark C. Kulik, Ann Arbor, MI (US); Naipaul D. Ramoutar, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/335,585

(22) Filed: Oct. 27, 2016

(51) Int. Cl.
  *B60R 21/34* (2011.01)
  *B62D 25/08* (2006.01)
  *B62D 21/15* (2006.01)
  *B60K 11/04* (2006.01)

(52) U.S. Cl.
  CPC ............ *B60R 21/34* (2013.01); *B60K 11/04* (2013.01); *B62D 21/152* (2013.01); *B62D 25/084* (2013.01); *B60R 2021/343* (2013.01)

(58) Field of Classification Search
  CPC ... B60R 2021/343; B60R 21/34; B60K 11/04; B62D 21/15–21/155
  See application file for complete search history.

(56) References Cited

U.S. PATENT DOCUMENTS

| 6,540,275 | B1 | 4/2003 | Iwamoto et al. | |
|---|---|---|---|---|
| 7,331,413 | B2 | 2/2008 | Okai et al. | |
| 9,145,174 | B2 | 9/2015 | Iwano | |
| 2004/0195020 | A1* | 10/2004 | Suwa | B60K 11/04 180/68.4 |
| 2010/0314426 | A1* | 12/2010 | Yokoi | B60K 11/04 224/555 |

FOREIGN PATENT DOCUMENTS

| EP | 2599666 A1 | 6/2013 |
|---|---|---|
| JP | 4353119 B2 | 10/2009 |
| JP | 2015151056 A | 8/2015 |

* cited by examiner

*Primary Examiner* — Erez Gurari
(74) *Attorney, Agent, or Firm* — Dinsmore & Shohl LLP

(57) ABSTRACT

A mounting assembly for an automotive radiator, a vehicle including such a mounting and a method of mitigating an impact between a vehicle and a pedestrian. The assembly includes a radiator support and one or more brackets. Each bracket is made up of a first end portion that is secured to the radiator support and a second end portion extending forward of the radiator support such that it can be attached to a load-bearing structure within a vehicle. The brackets each include at least one enhanced collapsible zone in order to promote energy absorption relative to energy transmission in situations where a vehicle experiences a front-end impact with a pedestrian or other object. In this way, the added energy absorption by the brackets reduces the amount of impact energy being transmitted to more rigid vehicular structures such as the radiator and its support; this increase in impact energy absorption in turn results in less energy being delivered to the pedestrian.

20 Claims, 5 Drawing Sheets

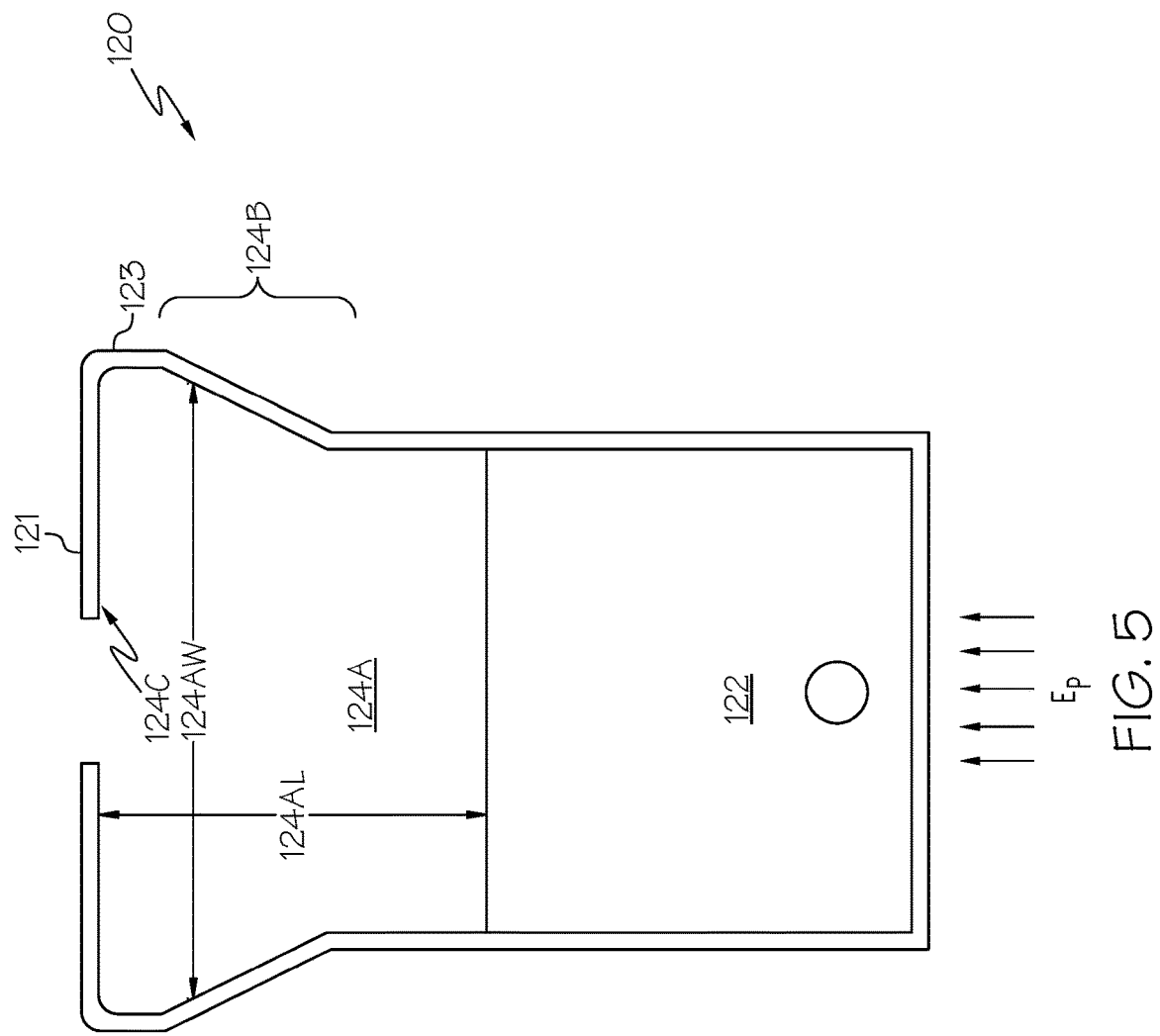

COLLAPSIBLE RADIATOR SUPPORT BRACKETS FOR PEDESTRIAN SAFETY

TECHNICAL FIELD

The present specification generally relates to structural assemblies that provide enhanced impact energy absorption for the front of a motor vehicle, and more particularly to collapsible radiator support brackets that provide improved pedestrian protection in the event of an impact between the pedestrian and the vehicle.

BACKGROUND

Automobile bodies are typically formed from numerous panels that are secured to a chassis or related frame-like support structure. In one common configuration, the front and rear panels are shaped to define fasciae that are part of bumper assemblies each of which are additionally made up of one or more laterally-extending bumper beams and energy-absorbing structure disposed between the beam and the respective fascia. Such assemblies may provide enhanced protection through elastic and plastic deformation of one or more of these components as a way to absorb energy in the event of an impact.

Accidents between a vehicle and a pedestrian present serious safety risks where the impact of the former can cause serious injury to the latter. This is particularly harmful when the initial impact involves the front of vehicle impacting the pedestrian's legs or lower abdominal region in that the relatively low-profile height and shape of the vehicle's front fascia and hood may tend to lift—and in some cases flip—the pedestrian such that the pedestrian's head strikes the vehicle's hood. Despite recent attempts by governing bodies to set limits on head impact goals for pedestrian-vehicle impacts, because of the relative rigidity of many of the components located at the fore end of the vehicle in general and underneath the hood and behind the fascia in particular, the likelihood is high that there will not be sufficient absorption of energy in the event of such an initial or secondary impact.

It is common design practice to locate the radiator as far upstream within the engine compartment as possible, as well as maximizing is surface area, both in an attempt to provide as much thermal exchange between the coolant that passes through for removing the latent heat of an operating internal combustion engine (ICE) and the incoming air that passes through perforations formed in the grille. To facilitate this forward-mounted position within the engine compartment, structurally robust upper and lower radiator supports made to act as frames around at least the top and bottom of the radiator are secured to other rigid members through one or more L-shaped brackets that extend along the vehicle lateral dimension. In one common form, the radiator supports and brackets define a relatively stiff load path between them and other fore-end members such as the grille, front fascia, bumpers, as well as the even more rigid bumper beams or other primary load-bearing structure. Unfortunately, this efficient transfer of loads by the brackets between the radiator support secured within the engine compartment and other rigid structure also has a tendency to exacerbate pedestrian trauma during impact, as it tends to merely convey the impact energy to other rigid structures within a localized pedestrian impact zone rather than absorb such energy.

Accordingly, a need exists for radiator support structures that are rigid enough to provide a secure load path during normal motor vehicle operation yet are collapsible upon front-impact impact with a pedestrian in order to absorb energy from such impact as a way to minimize harm to the pedestrian.

SUMMARY

In one embodiment, a mounting assembly for an automotive radiator is disclosed. The assembly includes a radiator support that is sized and shaped to secure the radiator therein, the radiator support defining a lateral dimension configured to extend substantially along the width of a vehicle to which the assembly is attached and an axial dimension configured to extend substantially along the length of a vehicle to which the assembly is attached. One or more brackets are connected to the radiator support. Each bracket is made up of a first end portion that is secured to the radiator support and a second end portion extending forward of the radiator support such that it can be attached to a load-bearing structure within a vehicle. The one or more brackets each include at least one enhanced collapsible zone in order to promote energy absorption relative to energy transmission in situations where a vehicle that includes the assembly incurs a front-end impact with a pedestrian or other object where harm thereto is sought to be minimized.

In another embodiment, a vehicle is disclosed. The vehicle includes a platform comprising a wheeled chassis defining a length dimension and a width dimension, a guidance apparatus cooperative with the wheeled chassis, a passenger compartment and an engine compartment, an ICE-based motive power unit secured to the platform within the engine compartment, a radiator thermally cooperative with the ICE to remove latent heat therefrom during the operation of the ICE, and a mounting assembly. The assembly includes a radiator support that secures the radiator to another structure within the vehicle in general and in or adjacent to the engine compartment in particular. The radiator and support are situated within the vehicle so that the support and radiator define a lateral dimension configured to extend substantially along the vehicle width, while an axial dimension is configured to extend substantially along the length of a vehicle; in this way, the radiator presents the largest possible cross-sectional area to the incoming air that passes through the grille when the vehicle is moving in a forward direction. One or more brackets are connected to the radiator support through a first bracket end portion, while a second end portion extends forward of the radiator support for attachment to a load-bearing structure within the vehicle. The one or more brackets each include at least one enhanced collapsible zone in order to promote energy absorption relative to energy transmission in situations where the vehicle is involved in a front-end impact with a pedestrian or other object.

In yet another embodiment, a method of mitigating an impact between a vehicle and a pedestrian is disclosed. The method includes arranging the vehicle to have a radiator mounting assembly made up of at least a radiator support and at least one bracket a first end portion of which is secured to the radiator support and a second end portion of which extends forward of the radiator and is attached to a load-bearing structure within the vehicle, the bracket including at least one enhanced collapsible zone. This enhanced collapsible zone permit the bracket to preferentially deform as a sacrificial member rather than merely transmit the impact load to another attached structure within the vehicle. As such, if during operation of the vehicle an impact occurs between a front end of the vehicle and a pedestrian, at least the longitudinal dimension of the load imparted to the vehicle from the pedestrian is transmitted through the impact location and load-bearing structure within the vehicle and into the radiator mounting assembly such that the load is at least partially absorbed through deformation of the enhanced collapsible zone. In such a method, the severity of harm to the pedestrian is reduced relative to no such pedestrian protection assembly being present on the vehicle in that at least some of the impact load is absorbed by the bracket rather than being passed through to the radiator support or other more rearward structural components where such absorption is less likely to occur.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 depicts a top view of one of the brackets of FIGS. 3 and 4.

DETAILED DESCRIPTION

Embodiments disclosed herein include a mounting assembly for a radiator to lessen the harm caused to a pedestrian in the event of a front-end impact between the pedestrian and the vehicle. Some embodiments may utilize one or more of tunable shaping, selective material removal and breakaway-prone or preferential bending-prone attachment structure to induce deformation in portions of the mounting assembly as a way to control impact in general, and to absorb impact energy rather than transmit such energy in particular. More particularly, a collapsible bracket that makes up a portion of the mounting assembly may be made with tailorable stiffness or compliance properties. In this way, the bracket can maintain stiffness during normal vehicular operation in order to perform its intended structural function, while being able to collapse at loads exerted from pedestrian impact that exceed the load-bearing capacity of the bracket. Thus, elastic modes of bracket deformation are preserved under normal operating conditions (which may also include incidental contact between the front of the vehicle and another object), but experiences plastic (i.e., permanent) deformation in response to a more significant impact such as that associated with a pedestrian/vehicle accident. These features are shown generally in FIGS. 3 through 5, and will be discussed in more detail below in conjunction with those and other figures. Without one or more of these features, it is harder to mitigate harmful impacts that may occur between pedestrian and vehicle, as an otherwise significant contributor to the load path in the form of the radiator support is left to merely transmit the energy associated with the impact rather than to absorb at least some of it. Embodiments incorporating the various features will be described in more detail below.

Figure 1:
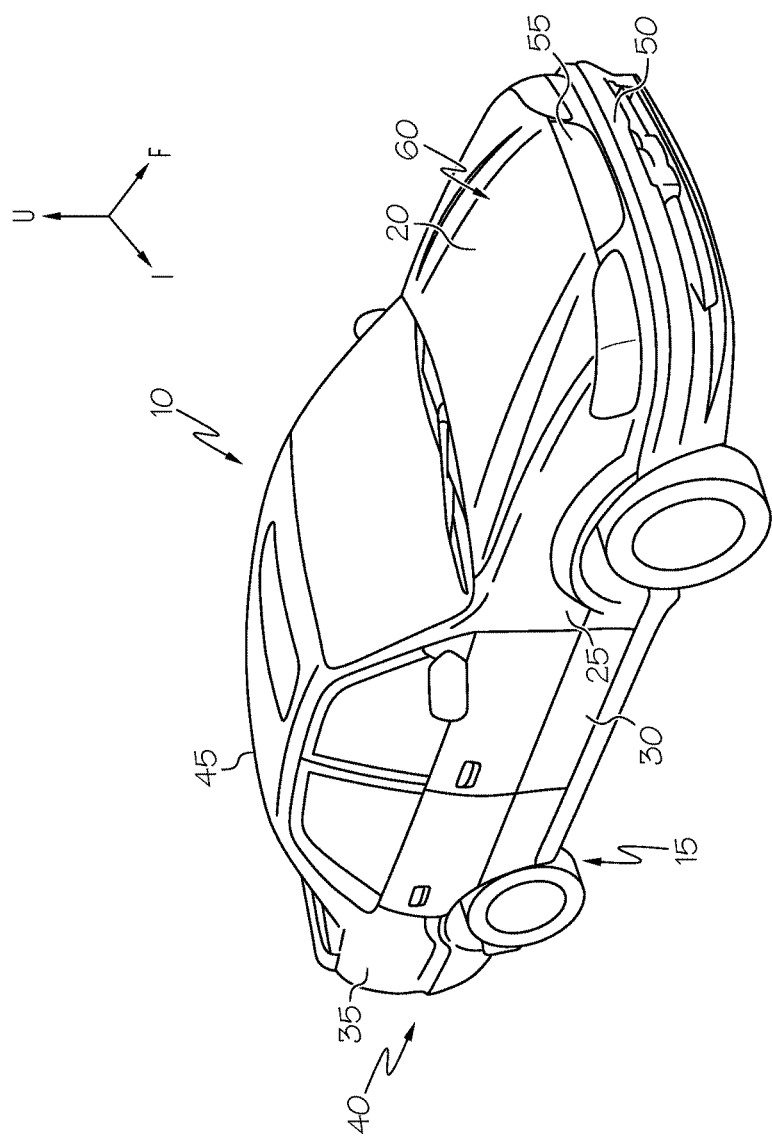
FIG. 1 depicts a perspective view of a vehicle according to one or more embodiments shown or described herein.

Referring first to FIG. 1, a motor vehicle 10 is shown in space where the Cartesian coordinates include orthogonal directions associated with the vehicle's forward F, upward U and inward I axes. As such, the lengthwise (or longitudinal or axial) dimension of vehicle 10 is collinear with the forward axis F, while the height dimension of the vehicle 10 is collinear with the upward axis U and the width (or lateral) dimension of the vehicle 10 is collinear with the inward axis I. The vehicle 10 includes a wheeled chassis 15 that provides support for the passenger compartment, motive unit and transmission (collectively referred to as the drivetrain) and guidance apparatus such as steering, accelerator and braking (none of which are shown). A suspension (not shown) may also be included to provide a dampened, compliant coupling between the wheels and the chassis 15. Numerous body panels include a hood 20, a front fenders 25, doors 30, quarter panels 35, rear fascia 40, roof 45 and front fascia 50. An engine compartment 60 is enclosed in the space beneath the hood 20. Each of the various panels 20, 25, 30, 35, 40, 45, 50 may be secured to the chassis 15 in a known manner through various beams, frames or related structural members (not shown). Likewise, many of the various panels 20, 25, 30, 35, 40, 45, 50 may be formed with dual-layer construction so that one or more of them have inner and outer layers. Properly construed, a front end 10A of vehicle 10 is that adjacent the hood 20, a front fenders 25 and front fascia 50, while a rear end 10B of vehicle 10 is that adjacent the quarter panels 35 and rear fascia 40.

Although shown presently as a sedan, it will be appreciated that vehicle 10 may encompass other architectures as well, including trucks, buses, vans, sport-utility vehicles, crossovers or the like. Moreover, it will be appreciated that while the vehicle 10 is discussed in terms of the chassis 15 upon which the other components are mounted, such discussion is equally applicable to traditional body-on-frame vehicular architectures as well as the relatively more recent variant known as unibody construction where the role traditionally played by the frame is replaced by high moment of inertia formations through a monocoque design where parts (for example, outer body panels, roofs or the like) that were not loaded in the more traditional body-on-frame design are now structural members. Regardless of whether vehicle 10 is of a body-on-frame or unibody construction, the chassis 15 forms the basic structural framework. It will be understood by those skilled in the art that unibody (or monocoque) designs tend to blur the lines between the structural chassis and the body, fenders and related coachwork; nevertheless, in either configuration, vehicle 10 includes the fundamental structural features associated with chassis 15, and either variant is deemed to be within the scope of the present disclosure.

Figure 2:
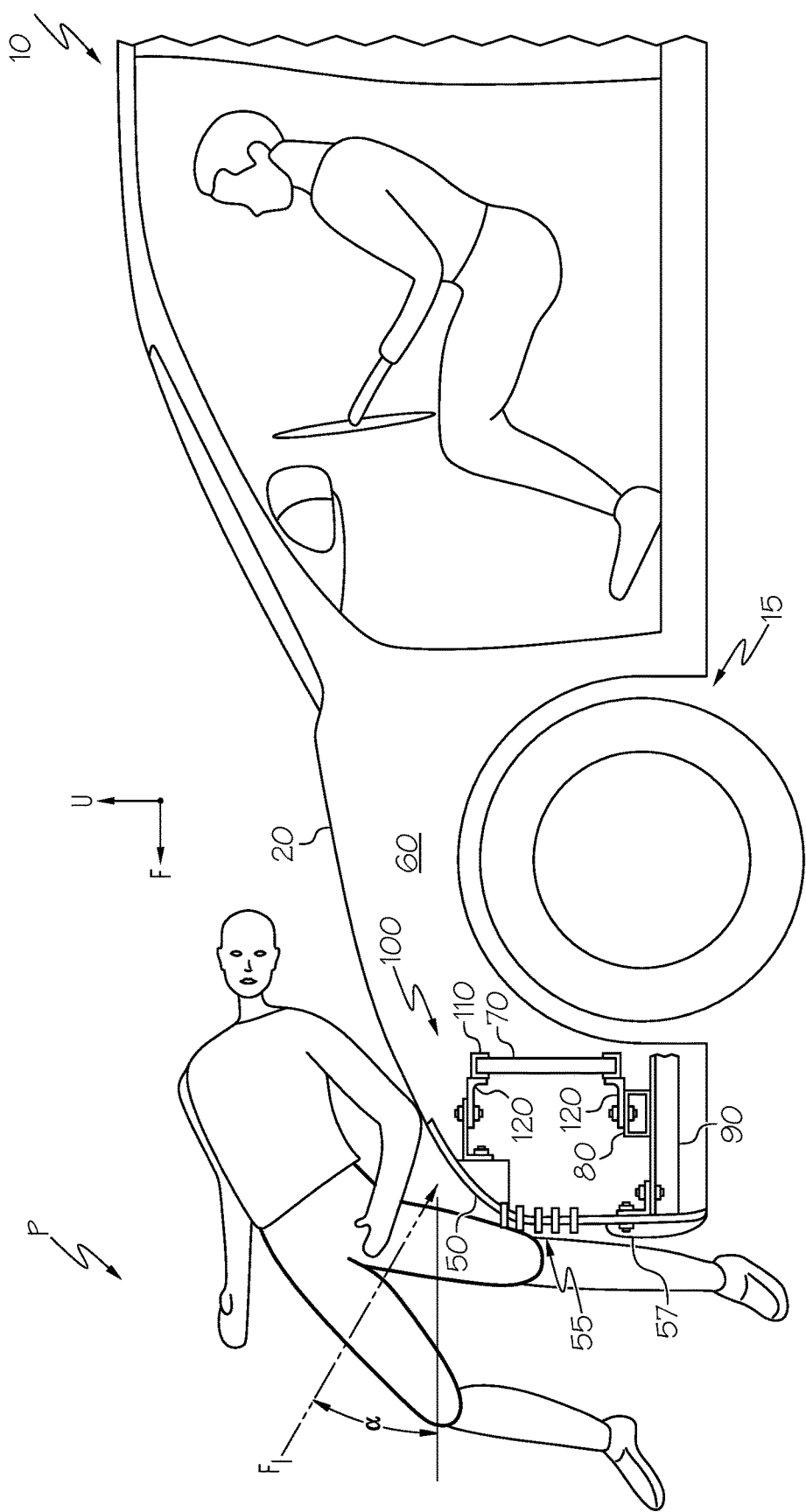
FIG. 2 depicts a partial side elevation view of a vehicle including a radiator and its mounting support structure according to one or more embodiments shown or described herein, as well as how it can help protect a pedestrian in the event of an impact.

Referring next to FIG. 2, the placement of a radiator 70 within the engine compartment 60 at the front end of vehicle 10 is shown in simplified form. The top and bottom edges of the radiator 70 are received into mounting assembly 100 that in turn is secured to one or more structural members such as bumper beam 80 for the lower or the front fascia 50 for the upper. In one form, the bumper beam 80 is a laterally-elongate metal structure that defines either a substantially linear (i.e., straight) profile or one with a forward bow. The front fascia 50 may be made of any suitable material, although in one preferred form is made from a molded polymeric-based material, and helps define through concealment of the bumper beam 80 and various other structural and utilitarian components a particular outward appearance and related exterior styling aesthetic of the front end of vehicle 10. Front fascia 50 and associated bumper components are attached to chassis 15, either directly or through other structural members such as apron, rail or related support 90 that is attached to or (in some configurations) itself a part of the chassis 15. Attachment between these various components may be in the form of rivets, bolted assemblies (as shown), screws, welds, brazes, adhesive or other known method. It will be appreciated that both the driver's side front fender 25 and some of the details associated with these notional attachment structures have been omitted for clarity of presenting the mounting assembly 100 disclosed herein, and that these and other representative details are known to those skilled in the art, and understood (along with other omitted components or systems) to be present in a fully-functional embodiment of vehicle 10.

There are various protocols used to test and reduce the potential harm to a pedestrian P in the event of an impact between the pedestrian P and the front end of vehicle 10. One such protocol—known as the European New Car Assessment Programme (Euro NCAP)—sets various front end criteria for vehicle 10 as a way to measure various impact scenarios, including head impact, upper leg impact (as shown) and lower leg impact. By way of examples, such testing includes considerations for wraparound distance (WAD), including those at various front end heights, impact angle (a), direction of impact, internal bumper reference line (IBRL), head impact time (HIT), tibia bending, knee elongation, femur bending and other factors. Details associated with the use of such protocols are incorporated in their entirety by reference.

Figure 3:
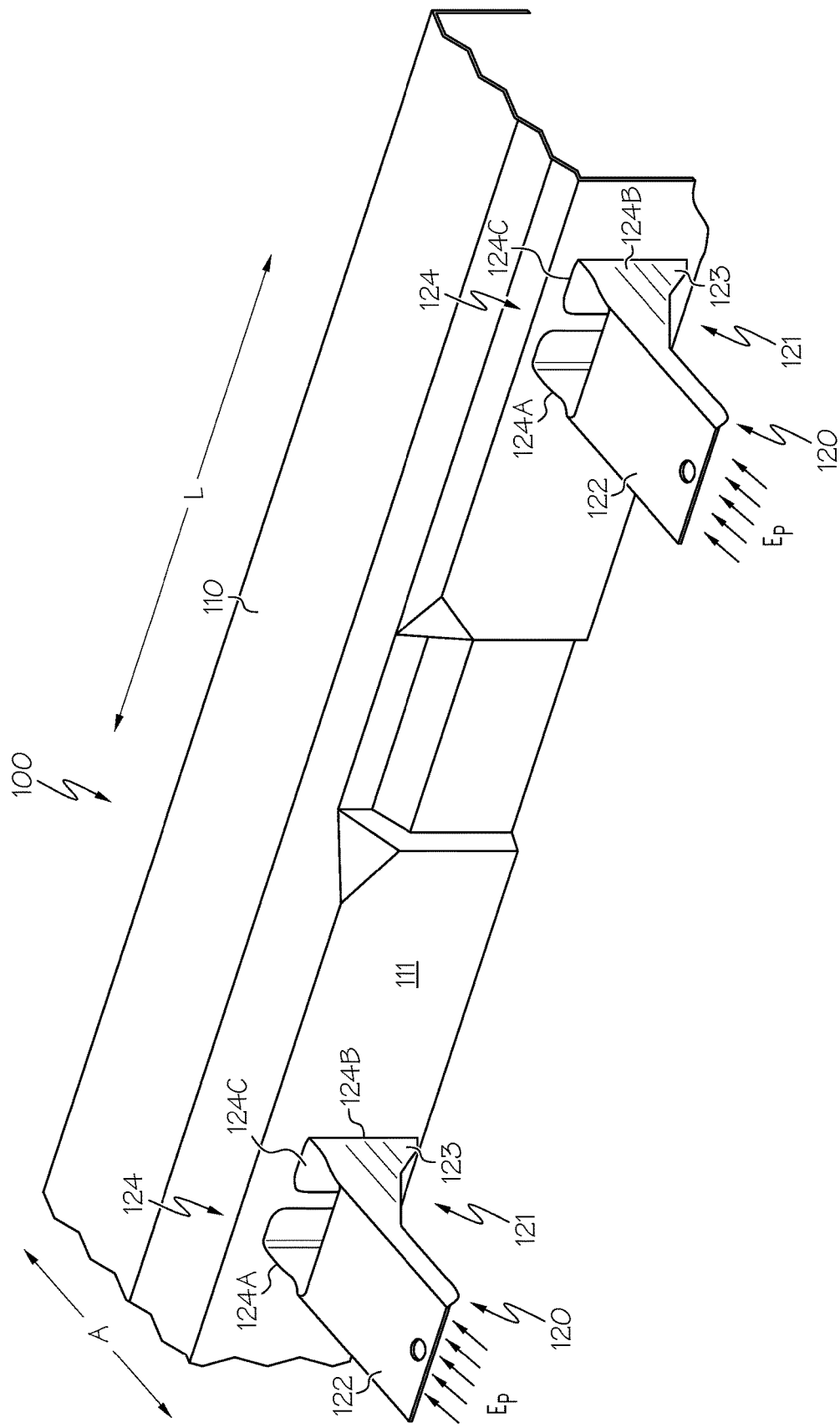
FIG. 3 depicts a top perspective view of an upper mounting support assembly in isolation from its radiator according to one or more embodiments shown or described herein, the mounting support assembly including a radiator support and numerous brackets.
Figure 4:
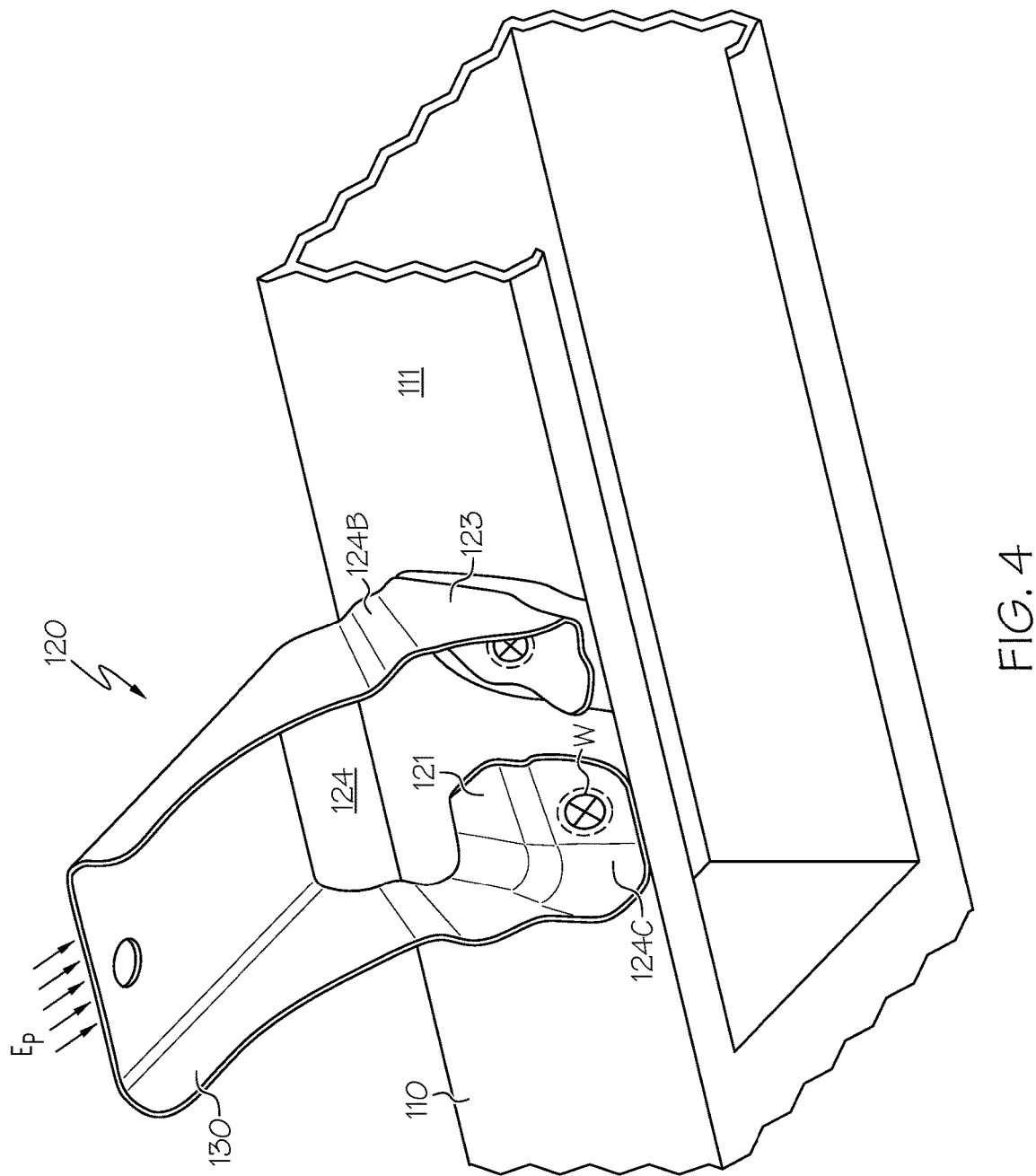
FIG. 4 depicts a bottom perspective view of the upper mounting support assembly of FIG. 3.

Referring next to FIGS. 3 through 5 in conjunction with FIG. 2, details associated with the mounting assembly 100 are shown. Within the present context, the mounting assembly 100 may also be referred to as a pedestrian protection assembly in that its primary purpose is to reduce the potential harm to a pedestrian P or other animate object in the event of an impact between the pedestrian P or object and the front end of vehicle 10. In particular, the assembly 100 includes one or more a radiator supports 110, each with numerous collapsible brackets 120 that are attached at one end to the radiator support 110 and at the other end either directly or indirectly to load-bearing components on vehicle 10; this latter connection is depicted notionally in FIG. 2 between the lower bracket 120 and the bumper beam 80 and rail 90 via bolted arrangement at the bottom, and between the upper bracket 120 and the front fascia 50, also via bolted arrangement, at the top. It will be appreciated that although not shown, an apron or rail similar to rail 90 could be situated near the top as a primary load-bearing structure to which the mounting assembly 100 could be attached. Although shown in simplified form in the figures, it will be appreciated that radiator support 110 may include various surface features in order to facilitate cooperation between the radiator support 110 and other vehicular components; because such features do not pertain to the present disclosure, they will not be discussed further.

In the form shown, the upper radiator support 110 defines a hollow box-like structure that can act as a clamp around the upper edge of the radiator 70, while a lower radiator support (not shown, but substantially identical in construction to the upper radiator support 110) can do the same for the radiator 70 lower edge. It will be appreciated that the box-like clamping engagement between the radiator support 110 and radiator 70 is merely exemplary, and that other configurational variants are possible so long as the radiator support 110 engages the radiator 70 in such a way that it helps maintain a secure precise placement of the radiator 70 within the vehicle 10 in general and the engine compartment 60 in particular. As such, all such variants are deemed to be within the scope of the present disclosure. In one form, the radiator support 110 is made from a material capable of long-term structural service; such materials may include metals, certain structural plastics, composites or the like. In configurations where the radiator support 110 is shaped to receive the upper or lower edge of the radiator 70, suitable molding, casting or forming operations may be used as a repeatable, low-cost fabrication approach.

Each collapsible bracket 120 may be configured with a generally L-shaped profile, as shown. As such, a first end portion 121 provides a generally vertical surface orientation that engages a facingly-adjacent front surface 111 of the radiator support 110, while a second end portion 122 provides a horizontal surface orientation that engages a facingly-adjacent surface of one of the aforementioned vehicular structural members (not shown). A pair of laterally-spaced legs 123 provide a measure of rotational stiffness between the first and second end portions 121, 122. Thus, when attached to the radiator support 110, the collapsible brackets 120 may extend outward from the radiator support 110 in a forward direction along the forward axis F toward the front of the vehicle 10. The horizontal surface of the second end portion 122 may include one or more bolt holes to permit a nut-and-bolt or related fastening or attachment scheme (not shown) to facilitate connection of the radiator support 110 to other vehicle structures.

In order to promote a more compliant structural attachment between the radiator 70, its support 110 and the remainder of the vehicle 10, the collapsible bracket 120 is provided with an enhanced collapsible zone 124 that is in turn made up of at least one of an aperture 124A, a tunable step 124B in one or both legs 123 defined within at least the first second end portion, and a reduced rigidity connection 124C between the first end portion 121 and the front face 111 of radiator support 110. Within the present disclosure, each of the aperture 124A, a tunable step 124B and reduced rigidity connection 124C can be construed as a feature or design option that can be used to facilitate the sacrificial construction of bracket 120. Without wishing to be bound by theory, the author of the present disclosure is of the belief that the primary way for the bracket 120 to preferentially absorb the loads associated with pedestrian impact energy $E_p$ is to tune one or more features of the enhanced collapsible zone 124 as a way to promote one or more modes of bracket 120 failure, including crushing-induced failure or buckling-induced failure. As discussed elsewhere herein, such deformation is preferable to having the brackets 120 merely transmit the pedestrian impact energy $E_p$ to another structural component in or around the engine compartment 60, as such transmission has a greater tendency to propagate the pedestrian impact energy $E_p$ back through the rigidly-coupled components to the original point of impact.

In one form, the enhanced collapsible zone 124 can be tuned to lower bracket 120 compressive strength as a way to promote the crushing-induced failure, yet still preserve enough of such strength in order to meet its structural load-bearing requirements for normal (i.e., non-impact) operating conditions. In another form, the enhanced collapsible zone 124 can be tuned to lower lower bracket 120 stability as a way to promote the buckling-induced failure, also while still meeting its other load-bearing requirements for normal operating conditions. Within the present context, the precise nature of the mode of failure is not as important as whether such failure can be reliably and repeatably produced. As such, the primary purpose of using the various design options within the enhanced collapsible zone 124 can is enhance pedestrian P safety by making it easier to initiate either of these (or any other) modes of failure.

Regarding the promotion of crushing-induced failure, the tunable step 124B design option is particularly well-suited to achieving the objectives associated with enhanced collapsibility in that there is a direct correlation between changing the moment of inertia within the legs 123 and the ability of the bracket 120 to absorb (rather than transmit) the pedestrian impact energy $E_p$. While adjustments to both the aperture 124A and the reduced rigidity connection 124C can help promote bracket 120 crushing in response to an applied axial load, it is believed that changes in the tunable step 124B have a more significant impact.

Regarding the promotion of buckling-induced failure, while impact-related loads may emanate from any direction, it is assumed that with regard to pedestrian-specific impacts (such as shown in FIG. 2), the majority of the impact energy $E_p$ arising out of contact between pedestrian P and vehicle 10 is directly along a horizontal axis that is substantially collinear with the vehicle's forward axis F such that the energy is transferred from the front fascia 50 and into various attachment structures and associated vehicular load-bearing members. Thus, the tailorable or tunable bracket 120 properties that correspond to the enhanced collapsible zone 124 have a preferential buckling-based deformation pattern to help promote the absorption of impact energy $E_p$ prior to such energy traveling rearward from the point of impact to the radiator 70 in lieu of the transmission of such energy to the radiator 70. Such bucking failure is associated with the rapid crushing or sideways collapse of the bracket 120 when it is under the axially compressive load (i.e., impact energy $E_p$) that arises from the contact. Within the present context, such sideways failure is expected to be caused by slight eccentricities in the way the impact energy $E_p$ is imparted to the bracket 120. Further without wishing to be bound by theory, the author of the present disclosure believes that these slight deviations from the purely axial load along the primary structural axis of the bracket 120 introduces a bending moment sufficient to cause instability in the bracket 120. The present disclosure takes advantage of this fact, in that because the compressive load associated with pedestrian/vehicle contact is rarely without some form of eccentricity in so-called "real world" situations, the likelihood of preferential buckling taking place within the enhanced collapsible zone 124 is increased, even if the stress associated with the impact energy $E_p$ is less than the load that the bracket 120 is designed to support. Each of the aperture 124A and the reduced rigidity connection 124C features that make up the enhanced collapsible zone 124 are particularly well-suited to promote the type of buckling failure in the bracket 120 discussed herein, and (along with the tunable step 124B that was discussed above in conjunction with the promotion of crushing-induced failure) are each discussed in more detail below.

The aperture 124A defines an exaggerated opening that spans the region within collapsible bracket 120 that is between the first and second end portions 121, 122. In a preferred form, the aperture 124A is sized to define an opening that spans the substantial entirety of the distance between the legs 123 along the lateral dimension L (which, when situated within vehicle 10 is substantially collinear with inward axis I). Likewise, aperture 124A is sized to define an opening that extends over at least a portion of the distance along the forward projection (which when situated within vehicle 10 is substantially collinear with forward axis F) of the second end portion 122. As shown, such an aperture 124A defines a generally rectangular profile in each of the first and second end portions 121, 122. By significantly enlarging the size of the aperture 124A relative to that of bolt holes or other cutouts that are used for conventional attachment or weight reduction, the stiffness of the brackets 120 can be tuned to achieve a desired level of bending, crumpling, crushing or related deformation. In one such form, the tuning can be a reduction in stiffness. Thus, by positioning the aperture 124A between the vertical and horizontal orientations defined by the first and second end portions 121, 122, and taking into consideration the constitutive properties of the material being used for the brackets 120, the axial stiffness of the brackets 120 in response to a longitudinal load from pedestrian P can be reduced to a level where the load being supported during normal operation of vehicle 10 is routinely within the designed structural criteria of the brackets 120, yet able to be the sacrificial member—by virtue of its plastic deformation—upon receipt of pedestrian impact energy $E_p$ so that the energy that travels from the point of impact toward the radiator 70 and its mounting structure 110 is not fed back to the leg or other body part of pedestrian P. While the larger void in bracket 120 resulting from a bigger aperture 124A can help to reduce the overall load-bearing capability of the bracket 120, its greater value is as a way to encourage the formation of a buckling-induced failure.

The legs 123 are laterally positioned around the aperture 124A and may be shaped to tune deformation of the collapsible bracket 120 during an impact. Significantly, the shape of the step 124B in at least one of the legs 123 can likewise be tailored to lower the stiffness of the second portion 122 relative to notionally straight legs. Moving from the horizontal second end portion 122 to the vertical first end portion 121, the legs 123 are shaped to have curved steps 124B that define an increasing lateral width such that the legs 123 define a broader base in the region adjacent the vertical first end portion 121 than in the region adjacent the horizontal second end portion 122. As such, the legs 123 are positioned closer to one another in the lateral direction at positions proximate to the horizontal portion of the collapsible bracket 120 than at positions proximate to the vertical portion. In fact, by forming the bends that produce the steps 124B in portions of the legs 123 farther inward or outward along the lateral dimension L, the failure mode being induced in the bracket 120 tends to resemble a crushing mode more than a buckling mode in that the failure takes place more as a result of the lower moment of inertia associated with laterally-oriented undulations in the shape of the legs 123 than it does with any eccentricity in the direction that the load associated with the pedestrian impact energy $E_p$ as applied to such legs 123. In situations where the steps 124B form at least a portion of the collapsible bracket 120, when an impact between the pedestrian P and the vehicle 10 occurs, buckling takes place within the legs 123 at the steps 124B more readily than if the steps 124B were not present, as the moment of inertia along the direction of the pedestrian impact energy $E_p$ is significantly reduced with the inclusion of the steps 124B. In other words, enhanced buckling is promoted at the steps 124B because they form the weakest link in the load path between the point of impact and the radiator support 110.

The first end portion 121 may include a flanged end that can be welded W to the adjacent surface 111 of the radiator support 110. As best shown in FIG. 4, the flanged end 124C is preferably turned laterally inward rather than laterally outward. This has the effect of reducing the size of the base of bracket 120 which in turn makes it easier for any eccentricities present in the pedestrian impact energy $E_p$ to initiate the preferential crushing, buckling, collapsing or related failure modes in the bracket 120 in advance of any such load transmission to the radiator support 110, radiator 70 or other rigid structure within the vehicle 10. Furthermore, the use of suitable welds W can help to ensure both ample connection between the bracket 120 and the adjacent face 111 of the radiator support 110, while also allowing for some design flexibility in when such connection should be overcome in response to the receipt of pedestrian impact energy $E_p$. As such, and for reasons similar to those of the aperture 124A, the flanged end 124C is particularly good at promoting a buckling-induced failure in the bracket 120.

Although not shown, constitutive properties (which describe macroscopic behavior of the bracket 120 resulting from the internal constitution of the material that makes up the bracket) may also be relied upon as a way to further tailor the response of the bracket 120 to an applied load such as that coming from pedestrian impact energy $E_p$. Material selections, such as choosing to use something with a higher or lower modulus of elasticity, can help identify where along the spectrum of Newtonian/viscous fluids at one end and Hookean/elastic solids at the other end the bracket 120 can be; such identification can consider plasticity, viscoelasticity and viscoplasticity material properties in addition to the other enhanced collapsible zone 124 features mentioned above. Such constitutive properties may be used to better predict the response of the bracket 120 to a load, which in turn can provide more insight into whether the contemplated changes to the enhanced collapsible zone 124 design options will result in the intended ability to absorb the pedestrian impact energy $E_p$.

Referring again to FIG. 2, it will be appreciated that vehicle 10 is an assemblage of disparate components, and that various integral forming techniques or attachment structures are used to secure these various vehicle components to one another. This is certainly prevalent in the front end of vehicle 10, where a grille 55 and various bumpers 57 may be formed as part of or otherwise attached to the front fascia 50. Likewise, the front fascia 50 may be attached to the radiator support 100, the front fenders 25, as well as to other beams, rails, aprons, frames or components that are in turn attached to or make up a part of the chassis 15 of vehicle 10. During an impact, it is desirable that the attachment structures—as well as the rigid components they connect—define part of the load path that permits certain components to become sacrificial members in that they preferentially deform and absorb energy associated with the impact. In the present context, two structures that are attached to one another as a way to define a load path between them need not be directly attached, but can also include indirect attachment through one or more intervening structural members, as long as such indirect attachment involves no appreciable reduction in transmission of the load as compared to a direct attachment counterpart. Examples of such loads include impact loads, weight-bearing loads and those loads that maintain disparate components within their predefined orientation in space relative to one another (such as those associated with an assemblage of such components). Likewise in the present context, terms such as "energy" and "load" when used in conjunction with vehicle-pedestrian impact and the related the absorption or transmission of energy or load as a result of such impact are meant to be used interchangeably.

During ordinary vehicle 10 operation, the mounting assembly 100 provides ample structural rigidity to ensure that the radiator 70 remains firmly secured within the engine compartment 60. In particular, the brackets 120 are capable of providing the attachment and load-supporting functions associated with keeping the radiator 70 situated within the supports 110. In the event of an accident where the front of the vehicle 10 impacts a pedestrian P, the brackets 120 may elastically and plastically deform to absorb energy through the compliant features associated with the enhanced collapsible zone 124.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mounting assembly for an automotive radiator, the assembly comprising:
   a radiator support sized and shaped to accept an automotive radiator therein, the radiator support defining a lateral dimension configured to extend substantially along the width of a vehicle to which the assembly is attached and an axial dimension configured to extend substantially along the length of a vehicle to which the assembly is attached; and
   at least one bracket comprising a first end portion that engages a facingly-adjacent front surface of the radiator support and a second end portion such that a substantial entirety of the bracket extends forward of the radiator support for attachment to a vehicular load-bearing structure, the bracket including at least one enhanced collapsible zone.

2. The assembly of claim 1, wherein the bracket defines a substantially L-shaped profile with the first end portion defining a vertical orientation of the profile and the second end portion defining a horizontal orientation of the profile, the first end portion being joined to the second end portion by a plurality of legs that are spaced apart from one another along the lateral dimension.

3. The assembly of claim 2, wherein the enhanced collapsible zone comprises at least one of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

4. The assembly of claim 2, wherein the enhanced collapsible zone comprises at least two of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

5. The assembly of claim 2, wherein the enhanced collapsible zone comprises each of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

6. The assembly of claim 5, wherein the reduced rigidity connection between the first end portion and the radiator support comprises an inwardly-facing flange formed on a portion of each of the legs that contacts a respective support-facing surface of the radiator support.

7. The assembly of claim 6, wherein the reduced rigidity connection between the first end portion and the radiator support further comprises a welded connection between each inwardly-facing flange and its respective support-facing surface.

8. The assembly of claim 3, wherein the tunable step shape comprises positioning the legs closer to one another along the lateral dimension at a position proximate to the horizontal orientation than at a position proximate to the vertical orientation.

9. The assembly of claim 1, wherein the at least one bracket comprises a plurality of brackets spaced apart from one another along the lateral dimension of the radiator support.

10. A motor vehicle comprising:
a platform comprising a wheeled chassis defining a length dimension and a width dimension, a guidance apparatus cooperative with the wheeled chassis, a passenger compartment and an engine compartment;
a motive power unit secured to the platform within the engine compartment, the motive power unit comprising an internal combustion engine;
a radiator thermally cooperative with the internal combustion engine and configured to remove latent heat therefrom; and
a radiator mounting assembly comprising:
a radiator support secured to at least a portion of the radiator; and
at least one bracket comprising a first end portion that engages a facingly-adjacent front surface of the radiator support and a second end portion such that a substantial entirety of the bracket extends forward of the radiator and the radiator support and is attached to a load-bearing structure within the vehicle, the bracket including at least one enhanced collapsible zone.

11. The vehicle of claim 10, wherein the assembly comprises a plurality of assemblies a first of which is disposed against an upper portion of the radiator and a second of which is disposed against a lower portion of the radiator.

12. The vehicle of claim 10, wherein the load-bearing structure within the vehicle is selected from the group consisting of a bumper beams, a grille, a front fascia and a bumper.

13. The vehicle of claim 10, wherein the bracket defines a substantially L-shaped profile with the first end portion defining a vertical orientation of the profile and the second end portion defining a horizontal orientation of the profile, the first end portion being joined to the second end portion by a plurality of legs that are spaced apart from one another along the lateral dimension.

14. The vehicle of claim 13, wherein the enhanced collapsible zone comprises at least one of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

15. The vehicle of claim 13, wherein the enhanced collapsible zone comprises at least two of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

16. The vehicle of claim 13, wherein the enhanced collapsible zone comprises each of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

17. A method of mitigating an impact between a vehicle and a pedestrian, the method comprising:
arranging the vehicle to have a radiator mounting assembly comprising:
a radiator support secured to at least a portion of the radiator; and
at least one bracket comprising a first end portion that engages a facingly-adjacent front surface of the radiator support and a second end portion such that a substantial entirety of the bracket extends forward of the radiator and the radiator support and is attached to a load-bearing structure within the vehicle, the bracket including at least one enhanced collapsible zone;
operating the vehicle such that if an impact occurs between a front end of the vehicle and a pedestrian, a load imparted to the vehicle from the pedestrian along a longitudinal dimension of the vehicle is transmitted through the load-bearing structure within the vehicle and into the radiator mounting assembly such that the load is at least partially absorbed through deformation of the enhanced collapsible zone.

18. The method of claim 17, wherein the load-bearing structure comprises a front fascia.

19. The method of claim 17, wherein the bracket defines a substantially L-shaped profile with the first end portion defining a vertical orientation of the profile and the second end portion defining a horizontal orientation of the profile, the first end portion being joined to the second end portion by a plurality of legs that are spaced apart from one another along the lateral dimension.

20. The method of claim 19, wherein the enhanced collapsible zone comprises at least one of (a) an aperture defined within at least the first second end portion, the aperture being sized to define a substantial entirety of the distance between the legs along the lateral dimension and over at least a portion of the distance along the axial dimension, (b) a tunable step shape in at least one of the legs and (c) a reduced rigidity connection between the first end portion and the radiator support.

\* \* \* \* \*

UNITED STATES PATENT AND TRADEMARK OFFICE
CERTIFICATE OF CORRECTION

PATENT NO. : 9,834,170 B1
APPLICATION NO. : 15/335585
DATED : December 5, 2017
INVENTOR(S) : Mark C. Kulik et al.

Page 1 of 1

It is certified that error appears in the above-identified patent and that said Letters Patent is hereby corrected as shown below:

In Column 5, Line 35, after "angle", delete "a" and insert --$\alpha$--, therefor.

Signed and Sealed this
Twentieth Day of February, 2018

Andrei Iancu
*Director of the United States Patent and Trademark Office*